June 12, 1962
C. J. ARNDT
3,038,590
FLUTED TAIL PULLEY
Filed Feb. 27, 1961
3 Sheets-Sheet 1
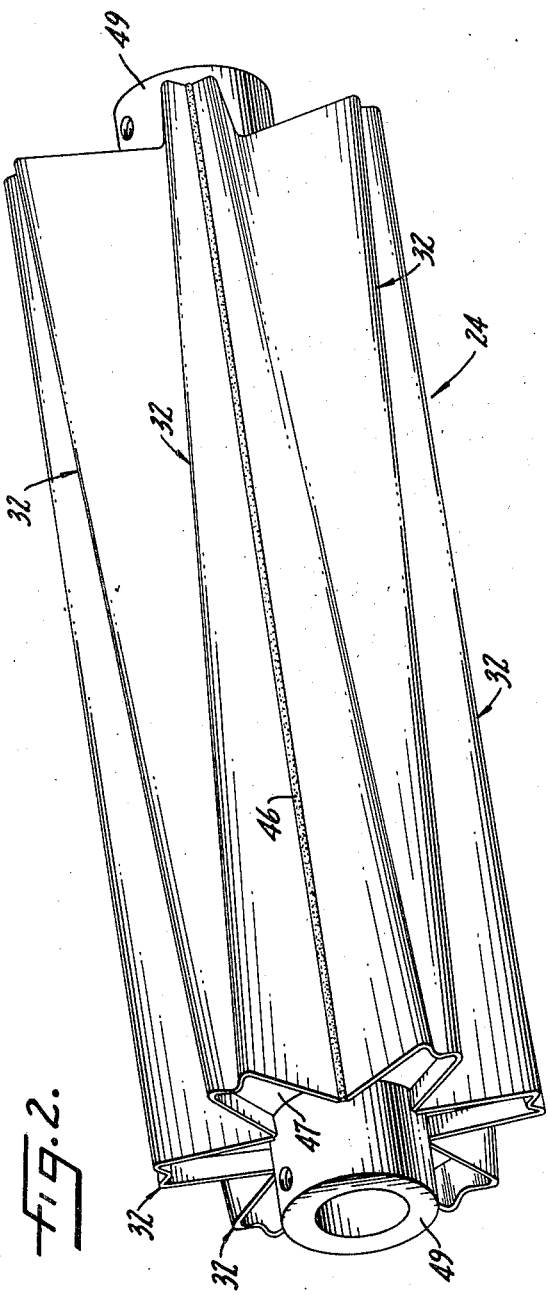
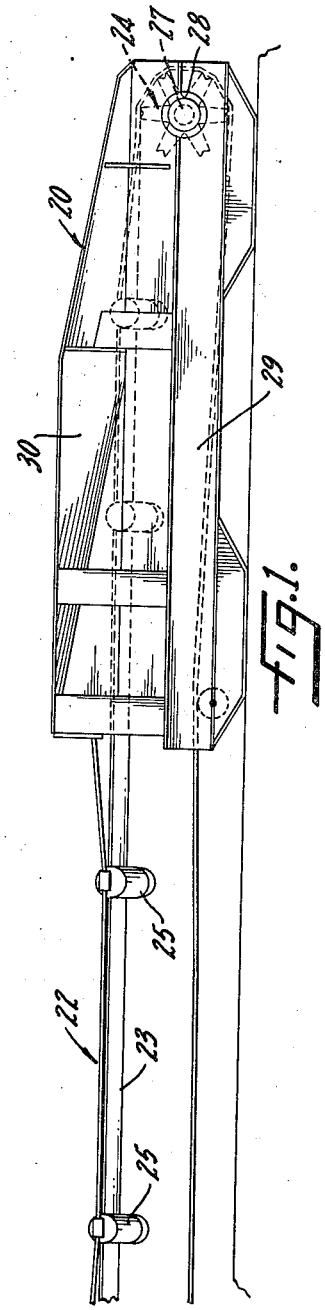
INVENTOR.
Charles J. Arndt,
BY Parker & Carter
Attorneys.

June 12, 1962
C. J. ARNDT
3,038,590
FLUTED TAIL PULLEY
Filed Feb. 27, 1961
3 Sheets-Sheet 2
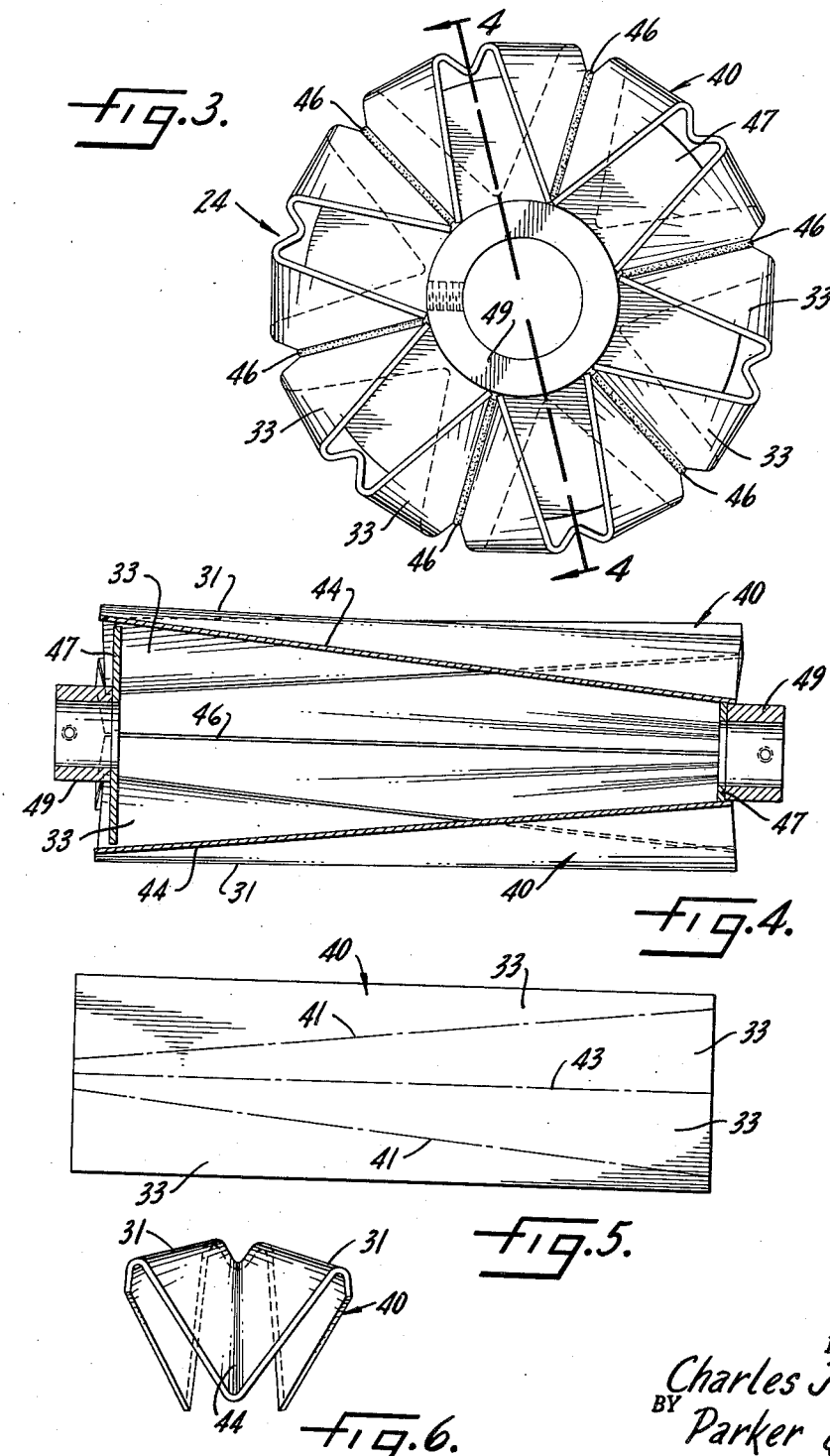
INVENTOR.
Charles J. Arndt,
BY Parker & Carter
Attorneys.

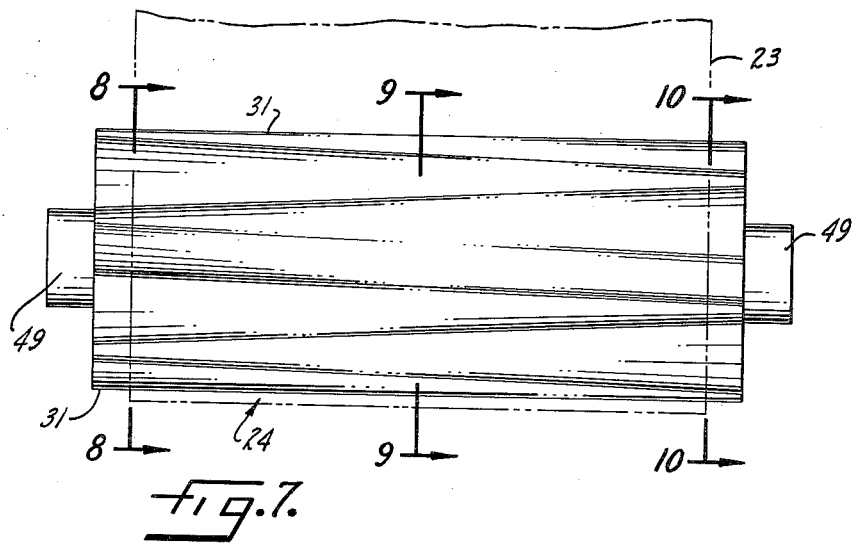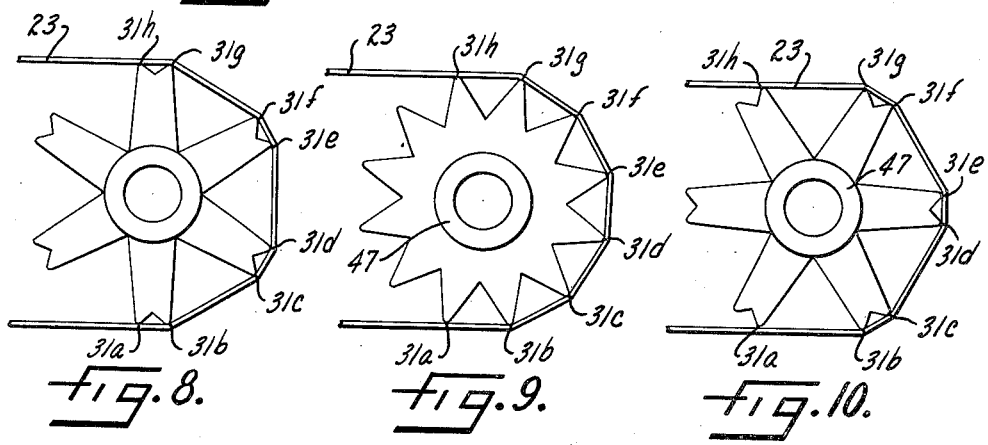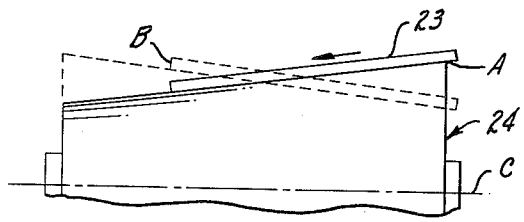

United States Patent Office 3,038,590
Patented June 12, 1962

3,038,590
FLUTED TAIL PULLEY
Charles J. Arndt, Harvey, Ill., assignor to Goodman Manufacturing Company, Chicago, Ill., a corporation of Illinois
Filed Feb. 27, 1961, Ser. No. 91,947
9 Claims. (Cl. 198—230)

This invention relates to improvements in fluted or vaned type direction changing pulleys, generally used at the tail end of a belt conveyor.

In the past, these pulleys have been cast or made of welded and cast construction. The weight and cost of this type pulley is excessive.

It is, therefore, the principal object of this invention to provide a lightweight vaned or fluted direction-changing pulley that is economical in manufacture and durable in use.

It is another object to provide a vaned direction-changing or tail pulley that is fabricated of shaped sheet metal sections.

Still another object is to provide a tail pulley with a superior means of self-cleaning.

Another object is to provide a fluted tail pulley with the ability to cam lump material from between the belt and pulley.

It is still another object to provide a vaned tail pulley that makes better use of the strength characteristics of material used in its construction.

Another object is to provide a vaned type tail pulley affording smoother travel of the belt around said pulley and at the same time puts less strain on the belt than in present constructions.

It is also an object of this invention to provide an improved vane type tail pulley with an automatic training action on the belt.

These and other objects will be apparent from the disclosures in the specification and drawings.

In the drawings:

FIGURE 1 is a side elevational view of the end portion of a belt conveyor showing a receiving or tail section incorporating a tail pulley constructed according to this invention;

FIGURE 2 is a perspective view of a fluted or vaned tail pulley removed from the tail section shown in FIGURE 1;

FIGURE 3 is an end view of the tail pulley shown in FIGURE 2;

FIGURE 4 is a sectional view taken on the line 4—4 of FIGURE 3;

FIGURE 5 is a development view of a piece of sheet metal plate used to fabricate the pulley;

FIGURE 6 is an end view of FIGURE 5 showing the shape of the plate after bending;

FIGURE 7 is a plan view of the pulley of FIGURE 1–6 showing the zig-zag belt contacting surfaces;

FIGURE 8 is a schematic sectional view taken on the line 8—8 of FIGURE 7;

FIGURE 9 is a schematic sectional view taken on the line 9—9 of FIGURE 7;

FIGURE 10 is a schematic sectional view taken on the line 10—10 of FIGURE 7; and FIGURE 11 is a schematic sectional view showing the belt training feature.

Like reference numerals will be used to refer to like parts throughout the following description of the figures.

Referring more particularly to FIGURE 1 of the drawings, the reference numeral 20 indicates a load receiving tail section for an endless belt conveyor 22. The tail section 20 is placed a suitable distance from a driving head section (not shown). An endless conveyor belt 23 is trained around direction-changing tail pulley 24 and around direction-changing and driving pulleys (not shown) located in the head section. The belt 23 is supported by suitable idler rollers 25 between the head and tail sections. The direction-changing tail pulley 24 is mounted on a shaft 27 journaled at its ends in bearing cartridges 28 which in turn are secured to frame 29 of the tail section 20.

The tail section 20 may be provided with load centering apron 30, mounted to the frame 29, to provide a hopper for the material to be conveyed. The direction-changing tail pulley 24 is of a fluted or vaned type which differs from the previous designs in that the vanes 32 are not parallel to each other but each vane is angle opposite to the adjacent vanes which results in a zig-zag pattern of contact with the belt.

The tail pulley 24 is fabricated by welding together a plurality of formed or bent plates 40, shown in FIGURES 5 and 6. Broken lines 41, 41 are bending lines that form the crests 31 and line 43 is the bend line which forms the low point 44 between vanes. Each vane is formed by a pair of plane surfaces or flats 33, 33 which meet at crests 31. These bent plate sections are joined at weldments 46, shown in FIGURE 3, to form a continuous drum surface. It was found that fabricating a tail pulley out of formed sheet metal makes better use of strength characteristics in the steel and the weight could be reduced substantially. A lighter weight pulley is easier to handle and less expensive to manufacture. The sides or flats 33 of adjacent vanes form between them the sides of a trough. The intersection of the sides of adjacent vanes form the low points, or roots, 44 of the troughs. As can best be seen from FIGURES 2, 3 and 4, each trough becomes progressively deeper from one end of the trough to the other, and adjacent troughs deepen in opposite directions along the pulley. Each crest is skewed with respect to the axis of the pulley, and each crest is non-parallel to each of the crests flanking it. Alternate crests are generally parallel to one another as can best be seen from FIGURE 7. End pieces 47, 47 are provided to strengthen and facilitate forming the pulley circumference. The end pieces have hubs 49 welded thereon for mounting the pulley 24 to shaft 27.

In the preferred embodiment the vanes 32 viewed at the left side of the pulley, shown in FIGURE 2, are spaced alternately close together and wide apart, and said vanes angle laterally across the pulley face to the other side. The wide spaced crests at the left-hand side converge at the opposite end and become closer spaced crests at the right-hand side. Inversely, the closely spaced crests at the left-hand side diverge to become the wider spaced crests at the other end, or right-hand side.

A V-shaped pocket or gap formed by adjacent vanes is wider at one side of the pulley than the other and also is deepest where it is widest. This feature provides superior cleaning action and eliminates trapping of lumps between the vanes. The improved cleaning action is due to the divergence of the fluted sidewalls which provide a downhill path for material to leave the pulley. The belt and diverging sidewalls provide a caming action to further urge material free of the pulley.

In the prior art, every vane is parallel to each other vane and consists of a radially extending rib with an enlarged belt contacting face. These vanes converge toward the pulley center and create a pocket into which material can accumulate. Accordingly, many of these pulleys are made with a frusto-conical hub portion with the largest diameter at mid-point. An outward tapered base, or floor, is provided for each pocket to reduce the trapping of fines, but when lumps are caught in the pulley flutes, there is nowhere the lumps can go. Because there is no lateral divergence of the pulley flutes, the only alternative for the lump is to be crushed into the fluted pockets by the belt. The force required to do this can cause damage to both belt and pulley. In the present structure, in addition to splendid cleaning ability, the pulley is made so the vanes cross-brace one another and virtually eliminate possibility of damage to the belt and pulley from lumps.

Forming the vanes still further improves the strength and wearing characteristics of the pulley. The sharp bends which form the crests 31 cause a hardening phenomenon to occur, probably due to plastic deformation. It was found in actual manufacture that the tensile strength and hardness had increased approximately 50 percent at the bends. This "work hardening" is realized at the places it is most beneficial, namely at the surfaces of the pulley in contact with the belt, and consequently, pulley wear is minimized. The increased tensile strength considerably aids the drum to withstand bending forces that may be imposed upon it.

The pulley's zig-zag surface pattern, see FIGURE 7, will greatly reduce any chance of internal belt damage. Since the vanes do not parallel the filling or cross strands of the belt fabric, many cross strands contact each vane, and each carries part of the belt strain. This belt strain would otherwise be borne solely by the strands carrying the normal belt tension that parallels the length of the belt.

Another advantage of the diagonal vanes is that they provide a rolling pick-up and consequently a smoother transport of the belt and lessen the slapping action inherent in the parallel vaned pulleys.

Referring now to FIGURES 8, 9 and 10, there is shown three sectional views of a tail pulley, taken at the left, center, and right-hand end, to compare the belt wrap, across the pulley face. Corresponding crests of adjacent vanes from view to view are indicated by the reference numeral 31 with a subscript. The wrap at the left, shown in FIGURE 8, is approximately 180 degrees; at the center, see FIGURE 9, about 150 degrees; and at the right-hand end, FIGURE 10, about 120 degrees. Rotating the pulley 30 degrees will reverse the amount of belt wrap at the ends, with the center wrap remaining the same. Rotating another 30 degrees and the ends will resume their original position. At any given instant, there will be an average wrap of 150 degrees along the pulley which is quite sufficient for driving and training purposes.

The ability to hold a belt on center is an important function of every tail pulley. To better understand the ability of a pulley made in accordance with the concept of this invention, refer to FIGURE 11 which shows a schematic section through the pulley, with the belt out of train to the right. Point "A" is located at the right-hand edge and "B" is at the left-hand edge of the belt. The solid and dotted lines illustrate the two opposing vane inclinations. Now with the belt off to the right, it is readily seen that point "A," which falls on the set of vanes that tend to urge the belt to the left, is a greater distance from the pulley center "C," than point "B" which falls on the series of vanes tending to urge the belt to the right, resulting in a greater force attempting to move the belt to the left. The belt will drift back to the center until a state of equilibrium is reached.

A new and novel pulley has been disclosed which provides the training effect, without the complexities, of a crowned pulley, but which is of a substantially uniform circumference.

Although a preferred embodiment of the invention has been illustrated and described, it will be apparent to one skilled in the art that modifications can be made within the framework of the invention. Accordingly, the scope of the invention should only be limited by the scope of the appended claims.

I claim:
1. A belt direction changing pulley adapted for use in a conveyor of the type having an orbitally movable endless flexible conveyor belt passing around head pulley means and tail pulley means, said direction changing pulley including a plurality of vanes located about the periphery of the pulley, each of said vanes extending at least from one end of the belt contacting length of the pulley to the other end of said belt contacting length, adjacent vanes forming between them at least the sides of a trough, said trough extending from one end of the pulley to the other, each trough progressively deepening from on end of the pulley to the other, adjacent troughs deepening towards opposite ends of the pulley, and means for mounting the pulley for rotation about its longitudinal axis.

2. The belt direction changing pulley of claim 1 further characterized in that the troughs are formed by the intersection of the sides of adjacent vanes.

3. The belt direction changing pulley of claim 1 further characterized in that the sides of each vane are planar.

4. The belt direction changing pulley of claim 1 further characterized in that each vane terminates, at its outermost radial extremity, in a crest extending the length of the vane, each crest being substantially harder than the material forming the adjoining portions of the vane.

5. The belt direction changing pulley of claim 1 further characterized in that each vane terminates, at its outermost radial extremity, in a crest extending the length of the vane, each of said crests being non-parallel to the axis of the pulley, each crest being non-parallel to the crest, on each immediately adjacent vane.

6. The belt direction changing pulley of claim 1 further characterized in that the vanes are formed from bent sheet stock.

7. The belt direction changing pulley of claim 6 further characterized in that said mounting means includes a pair of end pieces, each end piece extending a substantial distance into the area between spaced sides of adjacent vanes to thereby provide reinforcement to the vanes, said end pieces each having a substantially axial bore which enables the pulley to be mounted on a supporting member such as a shaft.

8. A direction changing pulley adapted for use in a conveyor of the type having an orbitally movable endless flexible conveyor belt passing around head pulley means and tail pulley means, said direction changing pulley including a plurality of vanes extending at least from one end to the other of the belt contacting length of the pulley, each vane being formed of a pair of flat plates which intersect at their outer edges to form a belt contacting crest extending the lengh of the pulley, each of said flat plates intersecting, along its inner edge, the inner edge of a flat plate of an adjacent vane to thereby form a unitary structure, the intersection of the inner edges of adjacent flat plates of adjacent vanes forming a series of troughs extending about the periphery of the pulley, each trough progressively deepening from one end of the pulley to the other, adjacent troughs deepening towards opposite ends of the pulley, and means for mounting the pulley for rotation about its longitudinal axis.

9. The direction changing pulley of claim 8 further characterized in that the vanes extend from one end of the pulley to the other.

References Cited in the file of this patent

UNITED STATES PATENTS 2,869,716     Vidmar              Jan. 20, 1959